Figure 1:
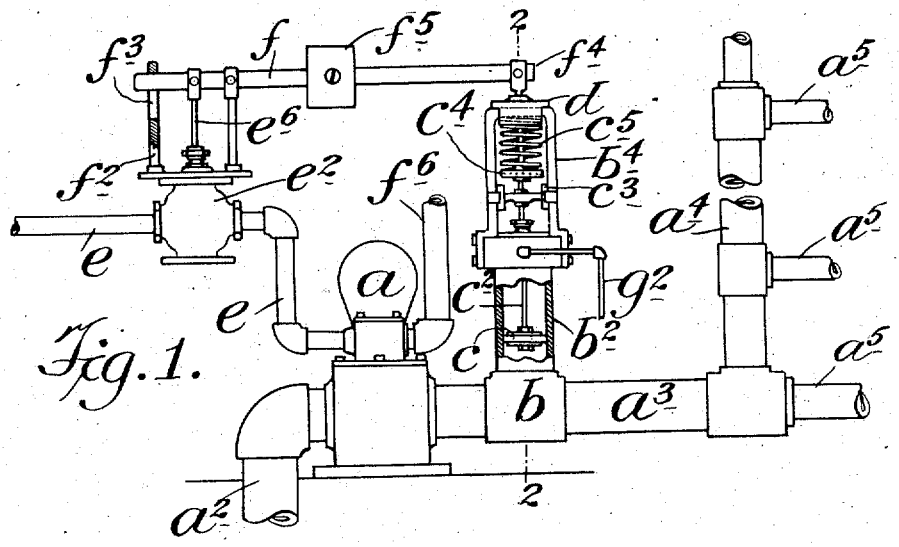

No. 12,302. REISSUED JAN. 10, 1905.

C. P. McMULLEN.

GOVERNOR FOR PUMPING ENGINES.

APPLICATION FILED DEC. 14, 1904.

2 SHEETS—SHEET 1.

WITNESSES

A. R. Appleman

F. A. Lemmert

INVENTOR

Charles P. McMullen

BY Edgar Tate & Co

ATTORNEYS

No. 12,302. REISSUED JAN. 10, 1905.

C. P. McMULLEN.

GOVERNOR FOR PUMPING ENGINES.

APPLICATION FILED DEC. 14, 1904.

2 SHEETS—SHEET 2.

WITNESSES

A. R. Appleman

F. A. Stewart

INVENTOR

Charles P. McMullen

BY

Edgar Tate & Co

ATTORNEYS

No. 12,302.

Reissued January 10, 1905.

UNITED STATES PATENT OFFICE.

CHARLES P. McMULLEN, OF NEW YORK, N. Y.

GOVERNOR FOR PUMPING-ENGINES.

SPECIFICATION forming part of Reissued Letters Patent No. 12,302, dated January 10, 1905.

Original No. 774,266, dated November 8, 1904. Application for reissue filed December 14, 1904. Serial No. 236,896.

*To all whom it may concern:*

Be it known that I, CHARLES P. McMULLEN, a citizen of the United States, residing in the borough of Brooklyn, city of New York, county of Kings, and State of New York, have invented certain new and useful Improvements in the Governors of Pumping-Engines, of which the following is a specification, such as will enable those skilled in the art to which it appertains to make and use the same.

The object of this invention is to provide an improvement in the governors of pumping-engines, whereby the cylinders of such governors may be kept thoroughly lubricated at all times, a further object being to provide an improvement of the class referred to for engines or apparatus of the class specified designed for use in buildings, steamers, and other vessels for pumping water into and through stand-pipes and other connections; and with these and other objects in view the invention consists in the construction, combination, and arrangement of parts hereinafter described and claimed.

The invention is fully disclosed in the following specification, of which the accompanying drawings form a part, in which the separate parts of my improvement are designated by suitable reference characters in each of the views, and in which—

Figure 2:
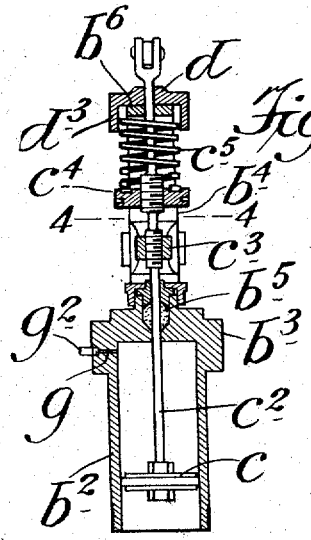
Figure 3:
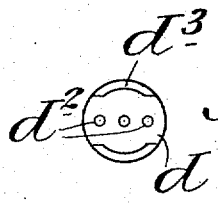
Figure 4:
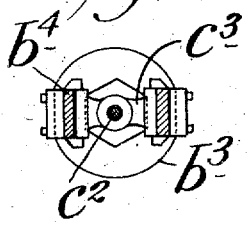
Figure 5:
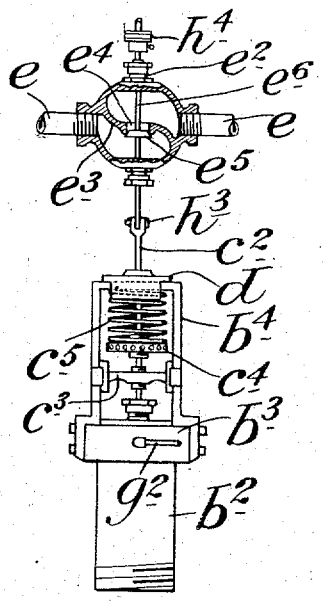

Figure 1 is a sectional side view of a pumping-engine and its connections provided with my improved governor; Fig. 2, a section on the line 2 2 of Fig. 1; Fig. 3, a bottom plan view of a detail of the construction shown in Figs. 1 and 2; Fig. 4, a section on the line 4 4 of Fig. 2; Fig. 5, a sectional side elevation showing a modification of the construction shown in Fig. 1, and Fig. 6 a sectional side elevation of a part of the construction shown in Fig. 1 and showing an oiling device connected therewith.

In the drawings forming part of this specification I have shown at $a$ an ordinary pumping-engine with which is connected a water-supply pipe $a^2$, this connection being made in the ordinary manner, and connected with the pump $a$, opposite the connection of the water-supply pipe $a^2$, is a lead-pipe $a^3$, by means of which water is conveyed from the pump $a$ to a stand-pipe $a^4$, having branch connections $a^5$, with which in practice ordinary hose may be connected in the usual manner.

In the practice of my invention I connect with the lead-pipe $a^3$ a three-way coupling $b$, with which is connected a piston-cylinder $b^2$, having a head member $b^3$, with which is connected a yoke-shaped frame $b^4$, and placed in the cylinder $b^2$ is a piston $c$, having a rod $c^2$, which passes upwardly through the head $b^3$ of the cylinder $b^2$ and through a stuffing-box $b^5$, with which said head is provided, and through the head $b^6$ of the yoke-shaped frame $b^4$. The piston-rod $c^2$ also passes through a vertically-movable cross-head $c^3$, mounted in the yoke-shaped frame $b^4$, and the rod $c^2$ where it is passed through the cross-head $c^3$ is screw-threaded, and by means of this construction the position of said cross-head on said rod may be regulated or adjusted vertically. The rod $c^2$ is also provided above the cross-head $c^3$ with a nut $c^4$, between which and the head $b^6$ of the yoke-shaped frame $b^4$ is placed a spring $c^5$, and the nut $c^4$ is vertically adjustable on the rod $c^2$, and by means of this construction the tension of the spring $c^5$ may be regulated. Mounted on the cross-head $b^6$ of the yoke-shaped frame $b^4$ is a cap $d$, which is secured to the cross-head $b^6$ by means of screws or bolts passed through holes $d^2$, and said cap is provided with side flanges $d^3$, which hold the spring $c^5$ in proper position. A bottom plan view of the cap $d$ is given in Fig. 3, and a plan of the cross-head $c^3$ and section of the yoke-shaped frame $b^4$ is given in Fig. 4.

Connected with the pump $a$ is a steam-supply pipe $e$, which may receive steam from any suitable source, and placed in this pipe is a throttle-valve $e^2$ of the ordinary construction and similar to that shown in Fig. 5, and said throttle-valve comprises a casing having a partition $e^3$, provided with a port or passage $e^4$, controlled by a valve $e^5$, connected with a valve-rod $e^6$, passing vertically through the valve-casing, and in the form of construction shown in Fig. 1 the throttle-valve is operated by the rod $e^6$, the upper end of which is connected with a lever $f$. The valve or valve-casing $e^2$ is provided at its opposite sides with supports $f^2$, to one of which the lever $f$ is pivoted, and the shorter end of the lever $f$ is movable in a vertical slot $f^3$, formed in the other support $f^2$, and the longer end of said lever is connected with the upper end of the piston-rod $c^2$, as shown at $f^4$, and said lever is also provided with an adjustable weight $f^5$.

The pump $a$ is provided with an exhaust-pipe $f^6$, and the operation of this construction, as shown in Figs. 1 to 4, inclusive, is as follows: It will be understood that the tension of the spring $c^5$ may be regulated to any desired extent, and the weight $f^2$ may also be adjusted so as to aid in regulating the pressure on the piston-rod $c^2$, and when the pump $a$ is put in operation the water will be forced through the lead-pipe $a^3$ into the stand-pipe $a^4$ and into the branch pipes $a^5$ in the usual manner. If at any time the pressure in the pipe $a^3$ reaches or exceeds a predetermined amount, the piston $c$ will be operated and the throttle-valve $e^2$ will be closed and the steam-supply to the pump will be cut off, and this action, as will be understood, is automatic at all times. As soon as the pressure in the pipe $a^3$ is lowered beyond the said predetermined point the operation of the piston $c$ will be reversed and the steam will again pass through the throttle-valve $e^2$ and the operation of the pump will be renewed. It will also be apparent that the flow of water from one or more of the branch pipes $a^5$ will lessen the pressure in the pipe $a^3$ and the pump $a$ will be operated with greater force, and the closing of one or more of the pipes $a^5$ will reverse this operation, the pressure in the pipe $a^3$ will be increased, and the piston $c$ will be operated and the supply of steam to the pump will be cut off, and the operation of the pump is thus made automatic.

The head $b^3$ of the cylinder $b^2$ is provided with a by-pass $g$, having a drain-pipe $g^2$, the object of which is to allow any water that may pass around the piston $c$ and collect in the upper end of the cylinder $b^2$ to flow out or drain out, and thus be prevented from being forced through the stuffing-box $b^5$.

Figure 6:
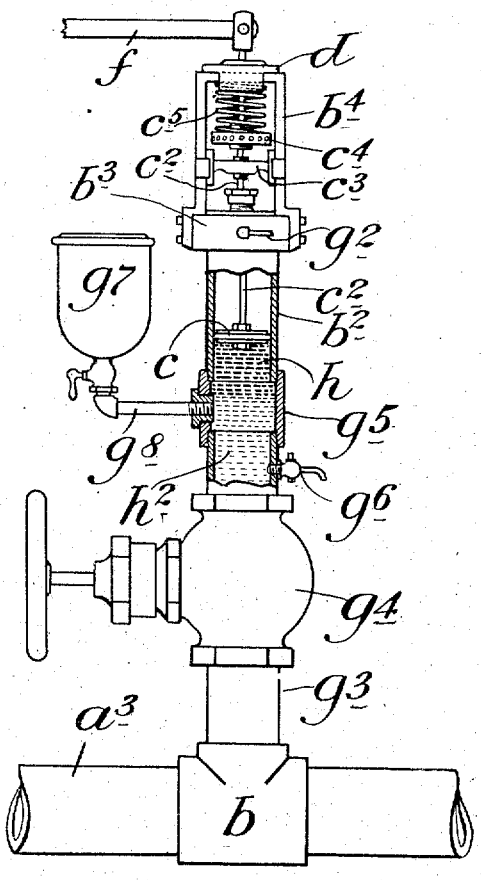

In Fig. 6 I have shown a modification, or rather a means for oiling the cylinder $b^2$, which is particularly designed for use in cases where salt water is pumped through the pipes $a^3$, $a^4$, and $a^5$, and for this purpose I connect with the three-way coupling $b$ a supplemental pipe $g^3$, with which the cylinder $b^2$ is connected, and the pipe $g^3$ is provided with a cut-off valve $g^4$. The cylinder $b^2$ is connected with the supplemental pipe $g^3$ by means of an intermediate coupling member $g^5$, below which is a drain-faucet $g^6$, and connected with the intermediate coupling member $g^5$ is an oil-cup $g^7$, this connection being made by means of a pipe $g^8$, and in practice whenever it is desired to oil the cylinder $b^2$ or the piston $c$ the valve $g^4$ is closed and any water in the cylinder $b^2$ is allowed to drain off through the drain-faucet $g^6$. Oil is then allowed to flow into the coupling member $g^5$ and cylinder $b^2$, and in Fig. 6 this oil is shown at $h^2$ as resting on the water $h^3$, and in this way the cylinder $b^2$ and the piston $c$ may be thoroughly lubricated at any and all times or whenever necessary.

In Fig. 5 I have shown a modification of the construction shown in Fig 1, in which the throttle-valve $e^2$ is placed directly over the cylinder $b^2$ and the valve-rod $e^6$ is connected directly with the upper end of the piston-rod $c^2$, as shown at $h^3$, and in this form of construction the valve-rod $e^6$ passes vertically through the casing of the throttle-valve and is vertically movable therein, and the upper end thereof is provided with a plurality of weights $h^4$. In this form of construction the spring $c^5$ operates in the same manner as with the construction shown in Fig. 1, and the weights $h^4$ take the place of the weight $f^5$, and the pressure of water necessary to operate the piston $c$ may thus be regulated.

Although I have shown and described my improvement for oiling or lubricating the cylinder of a particular form of governor for pumping-engines designed for pumping water through stand-pipes and other connections in buildings, steamers, and other vessels, it will be apparent that the same may be used in connection with governors for such engines of any desired construction, but which employ a cylinder and a piston movable therein, the engine being under the control of said piston, and I reserve the right to make all such alterations in the construction herein shown and described as fairly come within the scope of the invention.

Having fully described my invention, what I claim as new, and desire to secure by Letters Patent, is—

1. In an apparatus of the class described, a lead-pipe, a coupling connected therewith and provided with a cut-off valve, a cylinder connected with said coupling, a piston mounted in said cylinder and provided with a rod which passes out through one end thereof, a yoke-shaped frame connected with the end of the cylinder through which said rod passes, pressure devices mounted in said frame and operating in connection with said rod and means for oiling said cylinder, substantially as shown and described.

2. In an apparatus of the class described, a lead-pipe, a coupling connected therewith and provided with a cut-off valve, a cylinder connected with said coupling, a piston mounted in said cylinder and provided with a rod which passes out through one end thereof, a yoke-shaped frame connected with the end of the cylinder through which said rod passes, pressure devices mounted in said frame and operating in connection with said rod and means for oiling said cylinder comprising an oil-cup connected with the end thereof opposite that through which the piston-rod passes, and a drain-faucet connected with said coupling adjacent to the cylinder, substantially as shown and described.

3. In an apparatus of the class described, a lead water-pipe, a cylinder connected therewith, a piston movable in said cylinder, and means for supplying a lubricant to the end of said cylinder between said piston and said pipe, substantially as shown and described.

4. In an apparatus of the class described, a lead water-pipe connected therewith, a cylinder connected with said pipe, a piston movable in said cylinder and in operative connection with said pump, and means for supplying a lubricant to the end of the cylinder between said piston and said pipe, substantially as shown and described.

5. In an apparatus of the class described, a pump, a lead water-pipe connected therewith, a cylinder connected with said pipe and provided with a piston which is movable therein and in operative connection with said pump, and means for suppling a body of oil to the end of said cylinder between said piston and said pipe when the pump is in operation, substantially as shown and described.

6. In an apparatus of the class described, a lead water-pipe, a cylinder connected therewith and in communication therewith at one end thereof, a piston movable in said cylinder, devices for operating said piston, and means for supplying a body of oil to the end of the cylinder adjacent to said pipe, substantially as shown and described.

7. In an apparatus of the class described, a pump, a lead water-pipe connected therewith, a coupling connected with said lead water-pipe and provided with a valve, a cylinder connected with said coupling, a piston movable in said cylinder and means for supplying oil or a body of oil to the end of said cylinder adjacent to said coupling, substantially as shown and described.

8. In an apparatus of the class described, a pump, a lead water-pipe connected therewith, a coupling connected with said lead water-pipe and provided with a valve, a cylinder connected with said coupling, a piston movable in said cylinder and means for supplying oil or a body of oil to the end of said cylinder adjacent to said coupling, said piston being also provided with a rod in operative connection with said pump, substantially as shown and described.

In testimony that I claim the foregoing as my invention I have affixed my signature hereto, in the presence of the subscribing witnesses, this 1st day of December, 1904.

CHARLES P. McMULLEN.

Witnesses:

F. A. STEWART,

C. J. KLEIN.